United States Patent [19]

Beales et al.

[11] 4,351,659

[45] Sep. 28, 1982

[54] METHOD FOR MANUFACTURE OF GRADED INDEX OPTICAL FIBRES

[75] Inventors: Keith J. Beales, Ipswich; Clive R. Day, Woodbridge; George R. Newns, Hintlesham, all of England

[73] Assignee: The Post Office, London, England

[21] Appl. No.: 314,779

[22] Filed: Oct. 26, 1981

Related U.S. Application Data

[62] Division of Ser. No. 19,161, Mar. 9, 1979, abandoned.

[30] Foreign Application Priority Data

Mar. 14, 1978 [GB] United Kingdom ............ 100161/78

[51] Int. Cl.³ ............................................ C03C 25/02

[52] U.S. Cl. ........................................ 65/3.13; 65/12; 65/121

[58] Field of Search ................... 65/2, 3.13, 12, 121

[56] References Cited

U.S. PATENT DOCUMENTS

| | | | |
|---|---|---|---|
| 3,726,656 | 4/1973 | Reid et al. ................................. | 65/3 |
| 4,040,807 | 8/1977 | Midwinter et al. ............... | 65/121 X |
| 4,145,200 | 3/1979 | Yamazaki et al. ......................... | 65/2 |

Primary Examiner—Robert L. Lindsay, Jr.
Attorney, Agent, or Firm—Kemon & Estabrook

[57] ABSTRACT

A graded index optical fiber is produced in a double crucible with an elongate heated exit nozzle. The core and cladding glasses of the fiber diffuse into one another in the nozzle.

1 Claim, 1 Drawing Figure

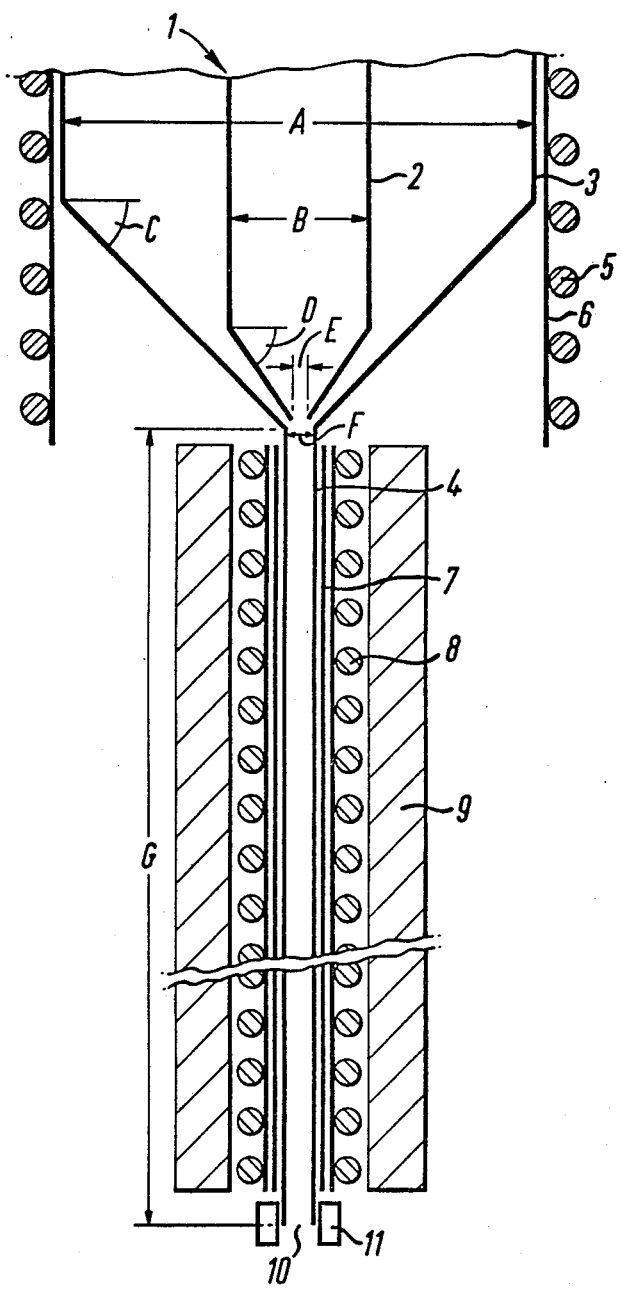

METHOD FOR MANUFACTURE OF GRADED INDEX OPTICAL FIBRES

This is a division of application Ser. No. 19,161, filed Mar. 9, 1979, now abandoned.

The present invention relates to improvements in double crucibles for use in the manufacture of graded index optical fibre, improvements in apparatus for use in the production of graded index optical fibre, and improved methods of manufacture of graded index optical fibre. By a graded index optical fibre we mean a fibre wherein the refractive index varies gradually from the centre of the fibre to radially outer positions.

When graded index optical fibre is produced by the double crucible process, the radial refractive index variation may be produced by subjecting the fibre which inherently comprises separate radially inner and outer parts (core and cladding) to thermal diffusion whereby the interface between the parts and the discrete change in refractive index is converted by the application of heat to a mixed region and a gradual change in refractive index. The diffusion effect should extend to the centre of the core and to a position radially outwardly of the junction between the core and cladding.

Ideally the optical fibre should be subjected to a heat treatment such that the quantity $Dt/a^2$, generally referred to as $\phi$, lies within the range of from 0.06 to 0.085, where D is the diffusion coefficient governing inter-diffusion between core and cladding, t is the duration of heat treatment, and a is the core radius; see British Pat. No. 1,460,333. It should be noted that even given the optimum value of $\phi$, the refractive index profile obtained is only an approximation to the ideal profile for a graded index optical fibre.

In a conventional double crucible, the time for which the two glasses are in contact at high temperature is controlled by the rate of flow of glass in through the cladding nozzle. If the flow is increased by raising the temperature, D is increased but t is reduced, resulting in little change in $\phi$. Any change will depend on the relative temperature dependence of D and of the glass viscosity. Large core graded index optical fibres are difficult to make in some glass systems with a value of $\phi$ as large as 0.08. It is therefore desirable to increase D in a manner which does not significantly increase the flow of glass in the cladding nozzle.

We have discovered that a satisfactory degree of diffusion can be contrived by extending the period in which the core and cladding glasses remain in contact with one another in the double crucible. The prior art sought to enhance the diffusion by the chemical content of the glasses.

According to the present invention there is provided a double crucible for the manufacture of graded index optical fibres, which double crucible comprises an outer body portion for holding molten cladding glass, an inner body portion, within the outer body portion, for holding molten core glass, the inner body portion having an exit orifice leading into the outer body portion, means for maintaining the said body portions at an elevated temperature, and means for extending the dwell period in which the core and cladding glasses remain in contact under diffusing conditions with one another in the crucible.

The means for extending the dwell period preferably involve providing on the outer body portion downstream of the exit orifice an elongate flow Zube provided with means for maintaining it at a temperature above that of the said body portions.

The invention further provides apparatus for manufacturing graded index optical fibres, which apparatus includes a double crucible as defined in the previous paragraph.

The length of the flow tube through which the fibre exits is substantial compared to the length of a conventional drawing nozzle so as to be sufficient to achieve the desired thermal diffusion between the core and cladding.

It is essential that the core glass and cladding glass come into contact prior to passage along the flow tube, and the exit orifice of the inner body portion must therefore be upstream of the flow tube.

Means may be provided for varying, especially lowering, the temperature of one region of the flow tube between the crucible body and the drawing nozzle, so that the flow rate of molten glass through the tube can be controlled. For example, a cold finger, i.e. a cooled element usually having cooling liquid flowing through it and placed adjacent a short region of the tube may be used to provide a lower-temperature region in that region.

Cooling means, for example, a cold finger, may also be provided adjacent to the drawing nozzle to control the drawing temperature of glass emerging from the nozzle.

According to a second aspect of the present invention there is a provided a method of manufacturing a graded index optical fibre by drawing a clad fibre from a double crucible, in which the inner crucible contains a core glass and the outer crucible contains a cladding glass, in which method, prior to drawing the optical fibre, molten core glass surrounded by and in contact with molten cladding glass is held in this contact for an extended period thereby achieving the desired diffusion characteristics. Preferably the glasses pass through an elongate flow tube at least a portion of which is maintained at a temperature higher than the temperature of the double crucible.

A region of the said flow tube may be maintained at a temperature which can be varied to permit control of the flow rate of glass through the flow tube. This allows the flow rate to be decreased thereby increasing the dwell time in which thermal diffusion takes place.

An embodiment of the invention will now be described, by way of example only, with reference to the accompanying drawing, which shows a diagrammatic representation, in section, of apparatus according to the present invention.

The apparatus shown in the drawing consists of a double crucible indicated generally by the reference numeral 1, having an inner body portion or inner crucible 2 and an outer body portion or outer crucible 3. Attached to the outer crucible 3 is a flow tube 4 which is relatively long compared with the nozzles usually attached to double crucibles. The body portions of the double crucible are heated by means of 10% platinum-rhodium alloy windings 5 mounted on an alumina winding former 6. The flow tube 4 is surrounded by a silica liner 7. The silica liner is surrounded by a heating element 8 comprising 10% platinum-rhodium wire wound on an alumina winding former. The windings are surrounded by thermal insulation material 9 of suitable form. Reference numeral 10 represents a drawing nozzle which is merely the end of the flow tube 4 from which the optical fibre is drawn. A cold finger 11 may be provided adjacent the drawing nozzle 10 to control the drawing temperature of glass emerging from the nozzle 10. The cold finger 11 consists of watercooled copper coils.

A typical double crucible according to the present invention will have an outer crucible diameter A of 60–62 mm and an inner crucible diameter B of 18 mm; angle C on the outer crucible will be 45°, and angle D on the inner crucible will be 55°; the nozzle on the inner crucible will have a diameter E of 2 mm; the flow tube will have a diameter of $3\frac{1}{2}$ mm, and the length of the flow tube G will be 300 mm. These dimensions are quoted by way of example only.

In use, the inner crucible 2 is filled with a glass which is to be used for the core of the optical fibre, and the outer crucible 3 is filled with a glass which is to be used as the cladding of the optical fibre. Both these glasses may, for example, be suitable soda-boro-silicate glasses such as those described in our U.K. Pat. No. 1,507,711 or, advantageously, one or both may be an alkaline-earth-oxide-modified soda-boro-silicate glass as described in our published E.P.C. Specification No. 0000282. When glasses of either of these types are used, the body portions 2 and 3 of the double crucible are maintained at a temperature within the range of from 900° to 950° C., at which temperature the glasses are of course molten. The flow tube 4 is heated independently of the body portions of the double crucible, and is maintained at a temperature which may be up to 100° C. higher than the crucible body. Increasing the temperature of the molten glass in the flow tube, and lengthening the flow tube, can enhance diffusion by a factor of up to ten on large core fibres.

In use, molten glass from the inner and outer crucibles 2 and 3 passes into the flow tube 4. The molten glass then passes through the flow tube 4 relatively slowly. The glass in the flow tube consists of an inner core of core glass, surrounded by cladding glass. At the drawing nozzle 10, the glass necks down into a fibre as it is drawn off using suitable drawing apparatus. The use of a long flow tube 4 increases the duration of the heat treatment during which thermal diffusion occurs, and the enhanced temperature of the flow tube 4 ensures an increased diffusion rate, since the diffusion coefficient increases with temperature. The actual drawing nozzle 10 should preferably be maintained at a temperature which is not substantially different from that of the body of the double crucible. If the temperature of the drawing nozzle is too high, flow instabilities can result which will cause diameter variations in the fibre.

The maximum temperature difference between the flow tube 4 and the main body of the crucible can be determined by experiment. If too high a temperature is used for the flow tube, this will create control problems for the temperature of the main crucible.

As explained in the introduction to the Specification, the refractive index profile which is closest to optimum is obtained when $\phi$ is within the range of from 0.06 to 0.085; values of $\phi$ less than this are caused by under-diffusion of the fibre and values of $\phi$ greater than this are caused by over-diffusion of the fibre.

The basic problem which this invention seeks to overcome is that arising from under-diffusion, i.e. inadequate diffusion of molten glass between the core and cladding. This is a problem which occurs principally with large core optical fibre, that is to say, fibres having core diameters within the range of from 50 to 70$\mu$. The measures described and particularly the elongation of tube 4 and the flow control measures described hereinafter increase the period during which the core and cladding glasses are in diffusing contact with one another.

The flow rate of glass through the flow tube 4 can be controlled by controlling the rate at which fibre is pulled from the drawing nozzle 10, and also by providing a short portion in the flow tube where a lower temperature is maintained. The use of a short lower temperature region such as indicated at 11 has the effect of introducing a large flow resistance, while not having an appreciable effect on the total diffusion. The intermediate cool region in the flow tube can, for example, be provided by use of a cold finger such as indicated at 11 and provided by a water filled copper coil.

We claim:
1. A method of manufacturing a graded index optical fibre in a double crucible comprising an outer body portion holding molten cladding glass, an inner body portion within the outer body portion, holding molten core glass, the inner body portion having an exit orifice leading into the outer body portion, the said body portions being maintained at an elevated temperature characterised by the steps of extending the dwell period in which the core and cladding glasses remain in contact under diffusing conditions with one another in the crucible by providing on the outer body portion downstream of the exit orifice an elongate flow tube, maintaining said flow tube at a temperature above that of the said body portions and lowering the temperature of one region of the elongate flow tube to control the flow rate of molten glass therethrough.

* * * * *